United States Patent
Mehandjiysky

(10) Patent No.: US 11,392,176 B2
(45) Date of Patent: Jul. 19, 2022

(54) DISPLAY SCREEN ADJUSTMENTS VIA RAILS

(71) Applicant: Hewlett-Packard Development Company, L.P., Spring, TX (US)

(72) Inventor: Dimitre D. Mehandjiysky, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,374

(22) PCT Filed: Jan. 4, 2019

(86) PCT No.: PCT/US2019/012337
§ 371 (c)(1),
(2) Date: Nov. 2, 2020

(87) PCT Pub. No.: WO2020/142104
PCT Pub. Date: Jul. 9, 2020

(65) Prior Publication Data
US 2021/0356994 A1    Nov. 18, 2021

(51) Int. Cl.
*G06F 1/16*        (2006.01)

(52) U.S. Cl.
CPC .......... *G06F 1/1652* (2013.01); *G06F 1/1656* (2013.01); *G06F 1/1679* (2013.01); *G06F 1/1681* (2013.01)

(58) Field of Classification Search
CPC .... G06F 1/1616; G06F 1/1624; G06F 1/1652; G06F 1/1681
See application file for complete search history.

(56) References Cited

U.S. PATENT DOCUMENTS

| | | | |
|---|---|---|---|
| 6,665,175 B1 | 12/2003 | Deboer et al. | |
| 7,646,593 B2 | 1/2010 | Smejkalova | |
| 7,715,180 B2 | 5/2010 | Titzler et al. | |
| 8,520,377 B2 * | 8/2013 | Senatori | G06F 1/1616 |
| | | | 361/679.55 |

(Continued)

FOREIGN PATENT DOCUMENTS

| | | |
|---|---|---|
| CN | 202494951 | 10/2012 |
| EP | 2479636 A2 | 7/2012 |

(Continued)

OTHER PUBLICATIONS

A Compact Design Strategy from Compaq, Core77, Retreived Nov. 6, 2018, 2 pgs, http://www.core77.com/reactor/compaq_design3.html.

*Primary Examiner* — Anthony Q Edwards
(74) *Attorney, Agent, or Firm* — Rahman LLC

(57) ABSTRACT

An example electronic device includes a flexible display screen; a cover operatively connected to the flexible display screen; a rail attached to the cover; and a first hinge attached to the flexible display screen to engage the rail. The flexible display screen is to translate with respect to the rail, and the flexible display screen is to rotate with respect to the first hinge. The rail is embedded in the cover. The rail may be positioned in a substantially center portion of the cover. The cover may include a first end and a second end. The first end is to rotate with respect to the flexible display screen. The second end may include a second hinge to enable rotation of the cover with respect to a base housing.

20 Claims, 11 Drawing Sheets

(56) References Cited

U.S. PATENT DOCUMENTS

| | | | |
|---|---|---|---|
| 9,218,022 B2* | 12/2015 | Tseng | G06F 1/1681 |
| 9,696,760 B1* | 7/2017 | Zhang | G06F 1/1649 |
| 10,082,833 B2 | 9/2018 | Chen | |
| 2001/0055197 A1 | 12/2001 | Agata et al. | |
| 2003/0021083 A1* | 1/2003 | Landry | G06F 3/03543 |
| | | | 361/679.06 |
| 2003/0103324 A1 | 6/2003 | Gallivan | |
| 2005/0206615 A1* | 9/2005 | Tanimoto | G06F 1/1616 |
| | | | 345/156 |
| 2007/0206349 A1* | 9/2007 | Jacobs | G06F 1/1616 |
| | | | 361/679.05 |
| 2008/0174943 A1* | 7/2008 | Hirasawa | G06F 1/1624 |
| | | | 361/679.57 |
| 2008/0265113 A1* | 10/2008 | Lin | F16M 11/2021 |
| | | | 345/60 |
| 2010/0182738 A1 | 7/2010 | Visser et al. | |
| 2011/0148797 A1 | 6/2011 | Huitema et al. | |
| 2013/0088824 A1* | 4/2013 | John | G06F 1/1637 |
| | | | 361/679.06 |
| 2014/0055429 A1 | 2/2014 | Kwon et al. | |
| 2014/0123436 A1 | 5/2014 | Griffin et al. | |
| 2014/0126133 A1 | 5/2014 | Griffin et al. | |
| 2015/0055287 A1 | 2/2015 | Seo | |
| 2015/0361696 A1 | 12/2015 | Tazbaz | |
| 2016/0132077 A1 | 5/2016 | Cheah et al. | |
| 2016/0320806 A1 | 11/2016 | Myers et al. | |
| 2017/0300082 A1* | 10/2017 | Park | F16M 11/2021 |
| 2017/0371370 A1* | 12/2017 | DeJule | G06F 1/1679 |
| 2018/0074553 A1 | 3/2018 | Yamazaki | |
| 2020/0178404 A1* | 6/2020 | Um | H01L 51/5237 |

FOREIGN PATENT DOCUMENTS

| | | |
|---|---|---|
| EP | 2521002 A2 | 11/2012 |
| WO | 2001/095076 A1 | 12/2001 |

* cited by examiner

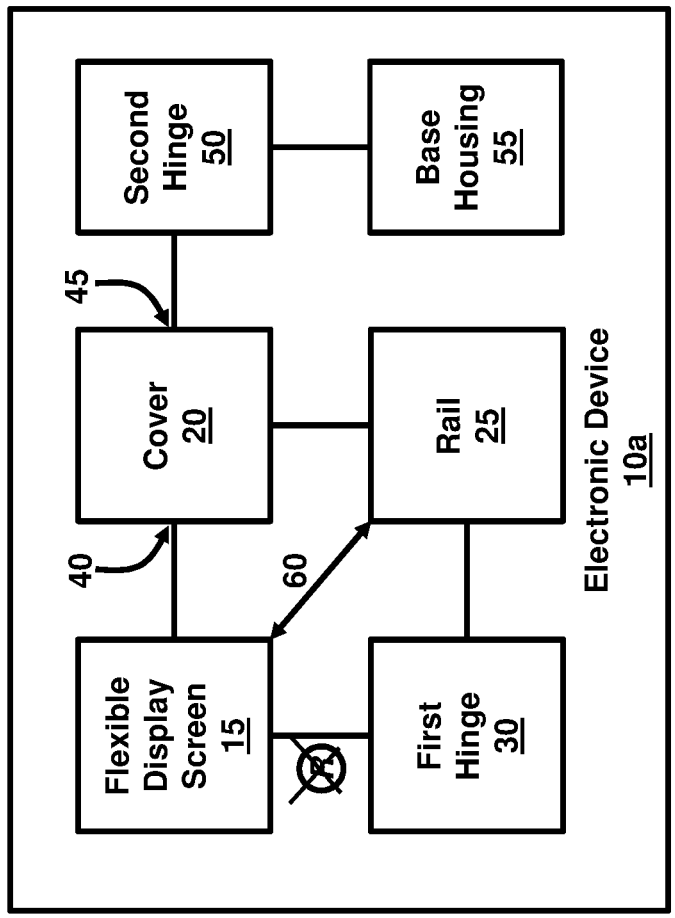

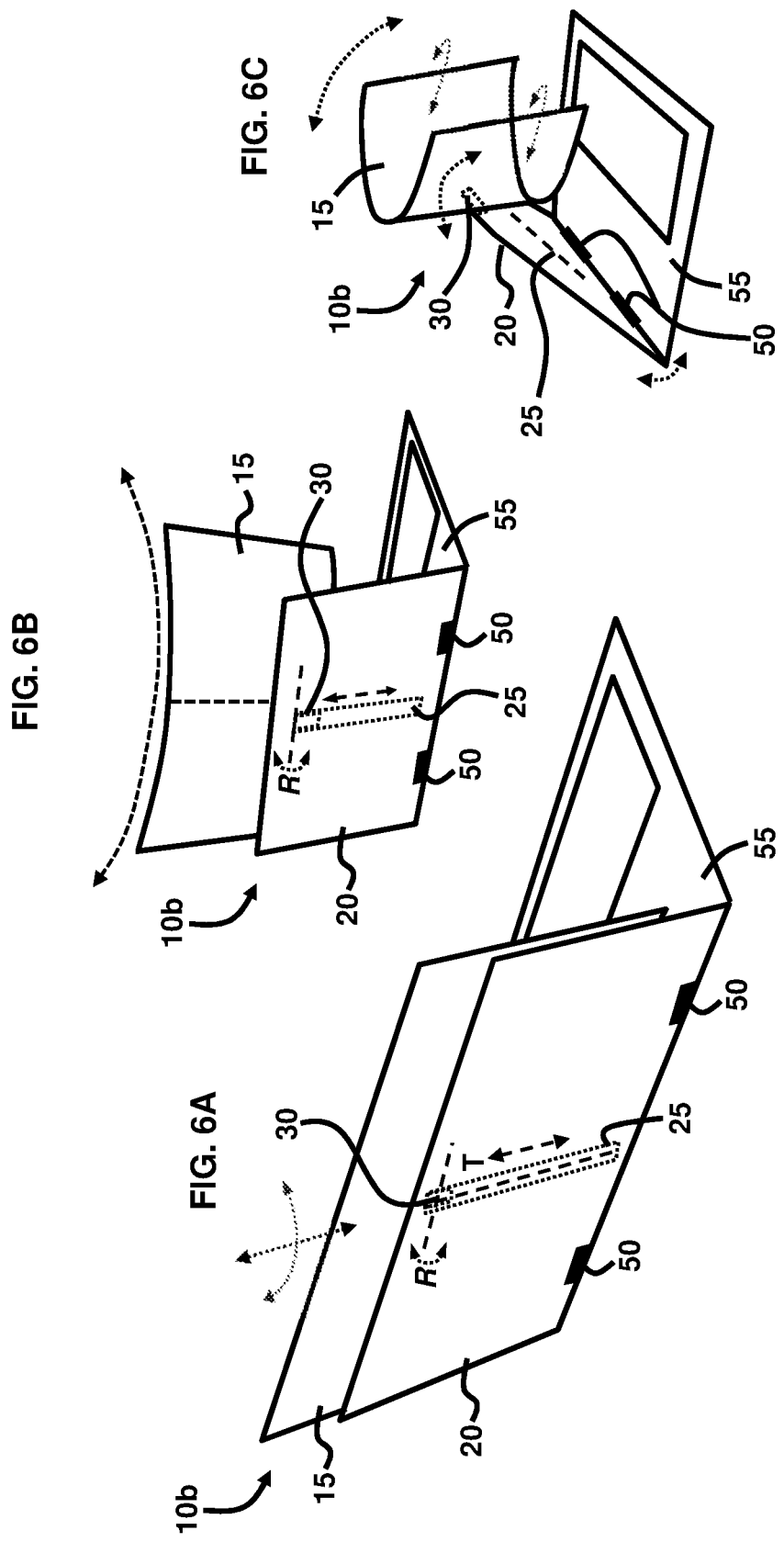

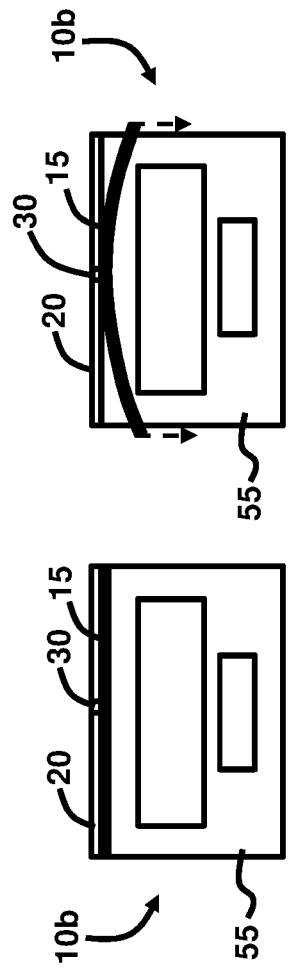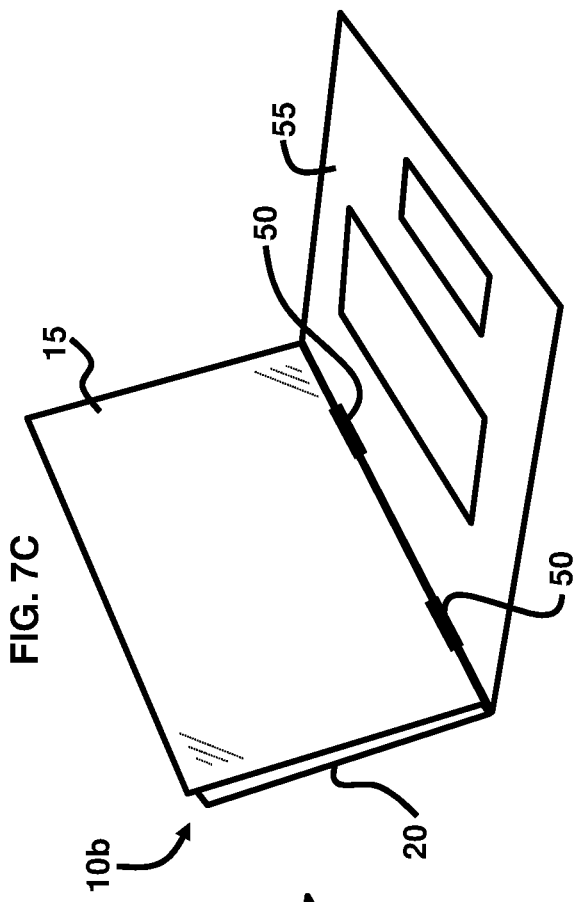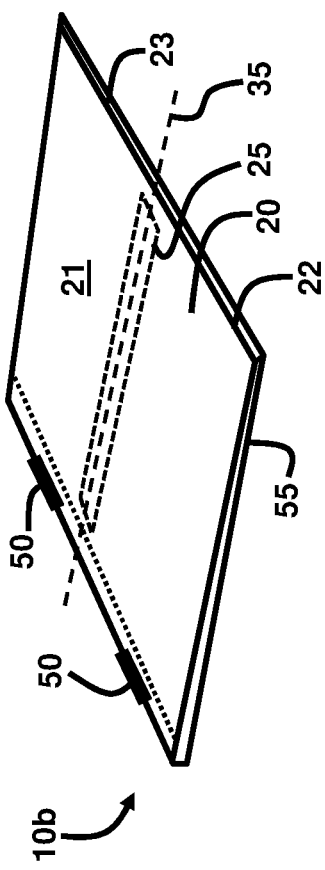

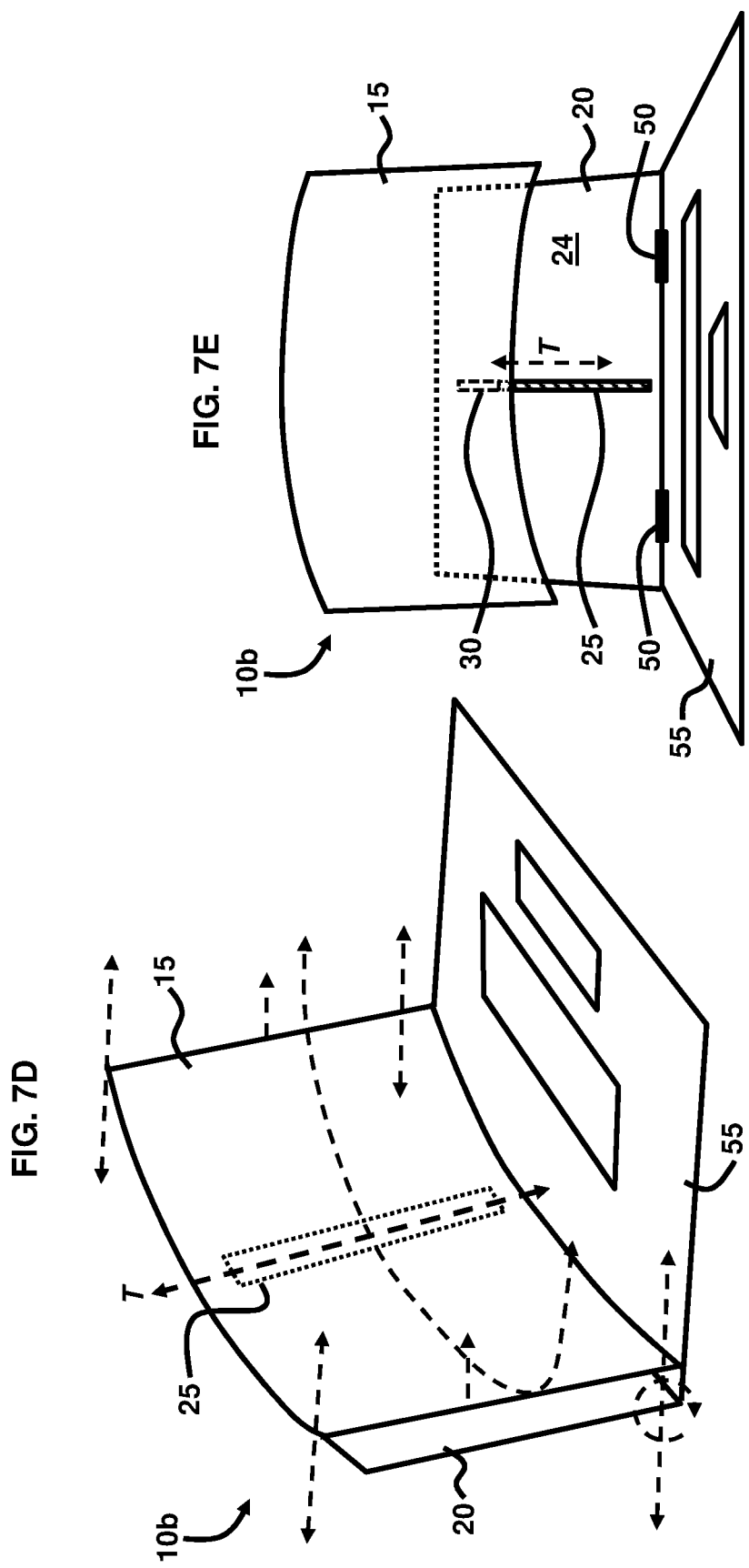

US 11,392,176 B2

DISPLAY SCREEN ADJUSTMENTS VIA RAILS

BACKGROUND

Electronic devices may contain display screens. Electronic devices such as laptops have connected display screens. The display screens may be positioned based on a user's preference.

BRIEF DESCRIPTION OF THE DRAWINGS

The following detailed description references the drawings, in which:

FIG. 5B is a block diagram illustrating the electronic device of FIG. 1 with the rotation of the flexible display screen being disabled, according to an example.

FIG. 6A is a schematic diagram illustrating a rear perspective view of an electronic device containing a translating and rotating flexible display screen in a generally flat position, according to an example.

FIG. 6B is a schematic diagram illustrating a rear perspective view of the electronic device of FIG. 6A containing a translating and rotating flexible display screen in a first bent or curved position, according to an example.

FIG. 6C is a schematic diagram illustrating a side perspective view of the electronic device of FIG. 6A containing a translating and rotating flexible display screen in a second bent or curved position, according to an example.

FIG. 7A is a schematic diagram illustrating top views of the electronic device of FIG. 6A with the display screen transitioning from a generally flat position to a bent or curved position, according to an example.

FIG. 7B is a schematic diagram illustrating a front perspective view of the electronic device of FIG. 6A in a closed position, according to an example.

FIG. 7C is a schematic diagram illustrating a front perspective view of the electronic device of FIG. 6A in an open position with the display screen in a generally flat position, according to an example.

FIG. 7D is a schematic diagram illustrating a front perspective view of the electronic device of FIG. 6A in an open position with the display screen in a bent or curved position, according to an example.

FIG. 7E is a schematic diagram illustrating a front view of the electronic device of FIG. 7A in an open position with the display screen raised along a rail and in a bent or curved position, according to an example.

Figure 2:
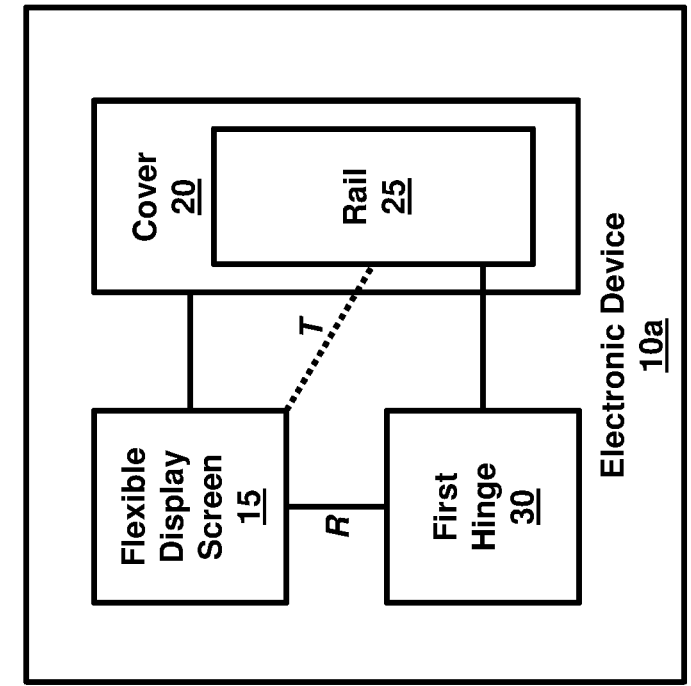
FIG. 2 is a block diagram illustrating the electronic device of FIG. 1 containing a rail embedded in a cover, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Notebook and laptop personal computers for gaming, business, office, or personal use may have a thin, light, robust, and visually-refined design with enhanced features to ensure a user-friendly experience. When the devices are set on top of a desk, their display screens may sit much lower than the user's eyes and horizon. This may cause the user to experience improper and bad posture requiring the user to bend forward with a downwardly inclined head in order to view the screen. Additionally, some display screens are relatively small causing the user to bend even further, particularly in order to become immersed in a gaming experience. To address this, some users place a laptop onto a higher platform such as stands, boxes, or even impromptu systems such as a stack of books. Some desks can become elevated. Sometimes users lower their chairs to align their eye level to the display screen. However, while these solutions may be helpful to overcoming the posture problem, they may be awkward and temporary solutions, which are not entirely ergonomically sound. Moreover, depending on the allotted space, the laptop's keyboard may be rendered unusable or positioned in an undesirable orientation. Furthermore, these solutions may significantly increase the distance between the user and the display screen rendering the user experience inadequate.

According to some example, a flexible display screen is provided for a personal or laptop computer, which is height and angle adjustable. The display screen is mounted on a thin structure, cover, or electronic device with a rail and a hinge centrally attached to its back. The railing is provided for height adjustability of the display screen and the hinge is provided for the angle/bend adjustability of the display screen. Hence, this system allows the user to bend or flatten the screen manually or by using a small network of embedded motors, and adjust its height. Therefore, the system is ergonomically good for the user in maintaining correct posture and distance from the display screen.

An example provides an electronic device comprising a flexible display screen; a cover operatively connected to the flexible display screen; a rail attached to the cover; and a first hinge attached to the flexible display screen to engage the rail. The flexible display screen is to translate with respect to the rail, and the flexible display screen is to rotate with respect to the first hinge. The rail may be embedded in the cover. The rail may be positioned in a substantially center portion of the cover. The cover may comprise a first end and a second end. The first end is to rotate with respect to the flexible display screen. The second end may comprise a second hinge to enable rotation of the cover with respect to a base housing. The flexible display screen may rotate with respect to the first hinge upon the flexible display screen being at a particular position with respect to the rail. The flexible display screen may be disabled from rotating with respect to the first hinge when the flexible display screen is at another position with respect to the rail other than the particular position.

Another example provides an electronic device comprising a cover; a base housing; a display screen slidably attached to the cover; and a rail operatively connected to the display screen. The rail is to permit the display screen to slide in an upward and downward direction with respect to the cover. A first hinge is attached to the display screen and the rail. The first hinge is to permit the display screen to rotate with respect to the rail. A second hinge is rotatably connecting the cover to the base housing. The display screen is to bend about the first hinge. The display screen may be operatively connected to one rail. A viewing angle of the display screen may be adjustable to be perpendicular to an eye level of a user of the display screen.

Another example provides an electronic device comprising a flexible display screen; a cover operatively connected to the flexible display screen; a rail in the cover; a hinge connecting the flexible display screen to the rail; and a processor to control movement of the hinge along the rail. The electronic device may comprise multiple pivot hinges on the flexible display screen synchronized to uniformly bend the flexible display screen. The electronic device may comprise a lock connected to the rail to set a position of the hinge on the rail. The processor is to control translational and rotational movement of the flexible display screen along the rail and with respect to the cover. Each of the flexible display screen and the cover may be rotatable.

Figure 1:
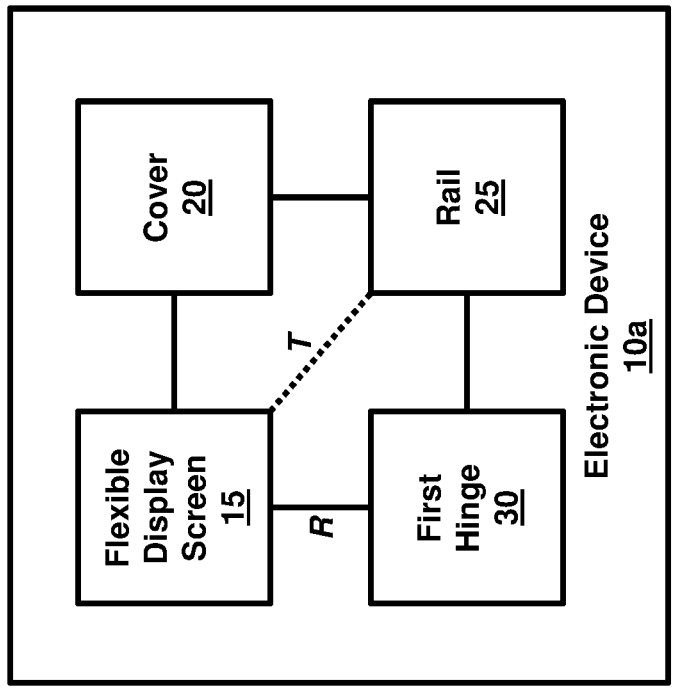
FIG. 1 is a block diagram illustrating an electronic device containing a translating and rotating flexible display screen, according to an example.

FIG. 1 is a block diagram illustrating an electronic device 10a. In some examples, the electronic device 10a may comprise a notebook or laptop computer device. The electronic device 10a comprises a flexible display screen 15. According to some examples, the flexible display screen 15 may comprise any of an organic light-emitting diode (OLED) device, phosphorescent organic light-emitting diode device, quantum dot light-emitting diode device, micro light-emitting diode device, and a flexible paper device, and may be a touch screen. Moreover, according to some examples, the flexible display screen 15 may include a flexible metal foil substrate or a flexible plastic substrate and an electroluminescent organic semiconductor containing printed electronics such as flexible printed circuits or flexible flat cables, which may be fabricated using roll-on manufacturing techniques. In some examples, the flexible plastic substrate may comprise polyethylene terephthalate (PET), polyimide, polyether ether ketone (PEEK), or transparent conductive polyester film. According to some examples, the flexible printed circuits may include any of flexible printed foil circuits, single-sided flex circuits, double access flex circuits, back bared flex circuits, sculptured flex circuits, double-sided flex circuits, multilayer flex circuits, rigid-flex circuits, and polymer thick film flex circuits. Furthermore, the flexible display screen 15 may comprise any suitable size or configuration to provide for a flexed, bendable, and/or curved orientation, or in a flat/planar orientation based on a user's preference. A cover 20 is operatively connected to the flexible display screen 15. In an example, the cover 20 may be a substantially thin structure, which may be the cover of the electronic device 10a; e.g., the cover of a laptop. The cover 20 may comprise plastic, aluminum, or any other suitable material. Moreover, in an example, the cover 20 may be a substantially rigid structure comprising sufficient material strength characteristics to fully support the flexible display screen 15.

The electronic device 10a comprises a rail 25 attached to the cover 20. According to some examples, the rail 25 may be a bar(s) or rack-like device or any other similar structure. The electronic device 10a comprises a first hinge 30 attached to the flexible display screen 15 to engage the rail 25. In some examples, the first hinge 30 may be a mechanical, electrical, magnetic, or electro-magnetic device, or a combination thereof, which may be set in position on the flexible display screen 15, and which may move along the rail 25. In an example, the combination of the rail 25 and first hinge 30 may operate similar to a rack-and-pinion system. Furthermore, the first hinge 30 may be set to be rotatable or permit connected structures be rotatable, according some examples.

In some examples, the flexible display screen 15 is to translate T with respect to the rail 25, and the flexible display screen 15 is to rotate R with respect to the first hinge 30. For example, the translational movement T of the flexible display screen 15 may be in an upward and downward direction along the rail 25 when the cover 20 is set at an upright position, which allows for a corresponding upright position of the flexible display screen 15. According to an example, the rail 25 may comprise a stepped device that permits the flexible display screen 15 to translate T in a step-wise manner and to automatically lock in position at each stage of the rail 25. In an example, the first hinge 30 may be lockable to allow the flexible display screen 15 to lock into position along the rail 25 to permit the flexible display screen 15 to be set at any position along the rail 25. In some examples, the flexible display screen 15 may translate T by a user manually moving the flexible display screen 15 along the rail 25, or the flexible display screen 15 may translate T using an automated approach. In some examples, the flexible display screen 15 may rotate R by a user manually rotating the flexible display screen 15 with respect to the first hinge 30, or the flexible display screen 15 may rotate R using an automated approach. The translation T and/or rotation R may occur using a programmed set of computerized instructions executed by the electronic device 10a and/or a button on the cover 20 or a graphical user interface (GUI) displayed on the flexible display screen 15 to cause the flexible display screen 15 to translate T with respect to the rail 25 and/or rotate R with respect to the first hinge 30. According to some examples, the translation T and/or rotation R may occur at any suitable speed, which may be constant or variable. In some examples, the angular rotation R of the flexible display screen 15 may be set at any suitable angular orientation, and in an example, may be limited only to the extent of the geometric constraints offered by the clearance of the cover 20 with respect to the flexible display screen 15.

FIG. 2, with reference to FIG. 1, is a block diagram illustrating that the rail 25 is embedded in the cover 20. According to some examples, the rail 25 may be partially or completely positioned in the cover 20 such that the first hinge 30 may extend into the cover 20 to engage the rail 25. In other examples, the flexible display screen 15 may be operatively connected to the rail 25 through a structure other than the first hinge 30 such that this other structure may extend from the flexible display screen 15 into the cover 20 to engage the rail 25 to permit the flexible display screen 15 to translate T along the rail 25. In some examples, the cover 20 may comprise an opening in the cover 20 and along the path of the rail 25 to permit the flexible display screen 15 to translate T along the rail 25 without interference.

Figure 3:
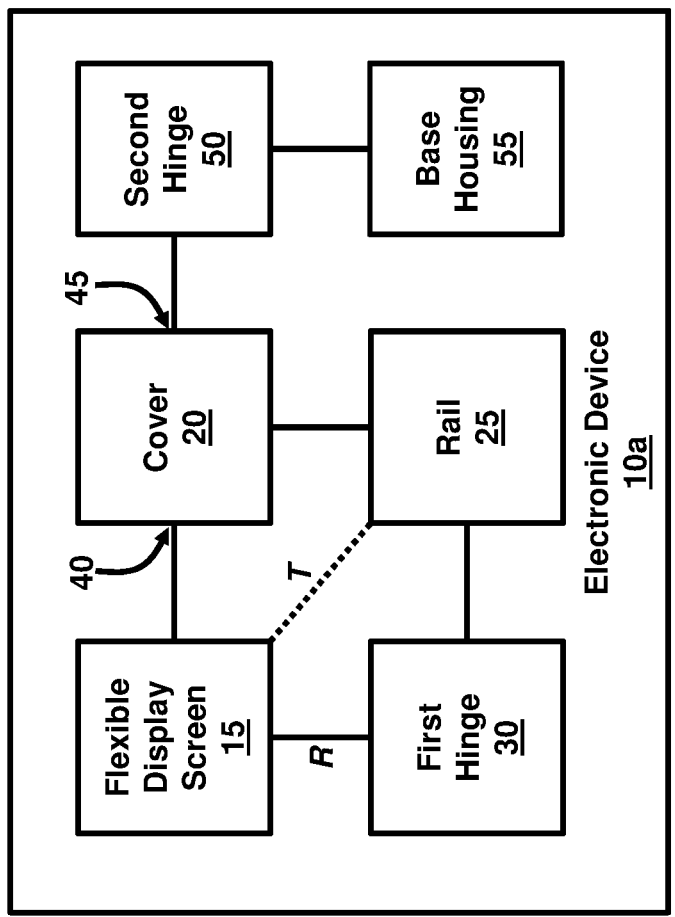
FIG. 3 is a block diagram illustrating the electronic device of FIG. 1 containing a rail substantially centrally positioned in a cover, according to an example.

FIG. 3, with reference to FIGS. 1 and 2, is a block diagram illustrating that the rail 25 may be positioned in a substantially center portion 35 of the cover 20. In an example, in order to provide for a proper weight balance of support for the flexible display screen 15 on the cover 20, the rail 25 may be positioned in the substantially center portion 35 of the cover 20, which obviates the need to have multiple rails positioned on the cover 20 or on the ends of the cover 20, which would result in increased cost, complexity, and weight of the electronic device 10a. In this regard, the rail 25 that is positioned in the substantially center portion 35 of the cover 20 may generally divide the cover 20 in half with respect to the width of the cover 20. The rail 25 may extend the entire height of the cover 20 in one example. Alternatively, the rail 25 may extend at a height that is less than the entire height of the cover 20, according to another example.

Figure 4:
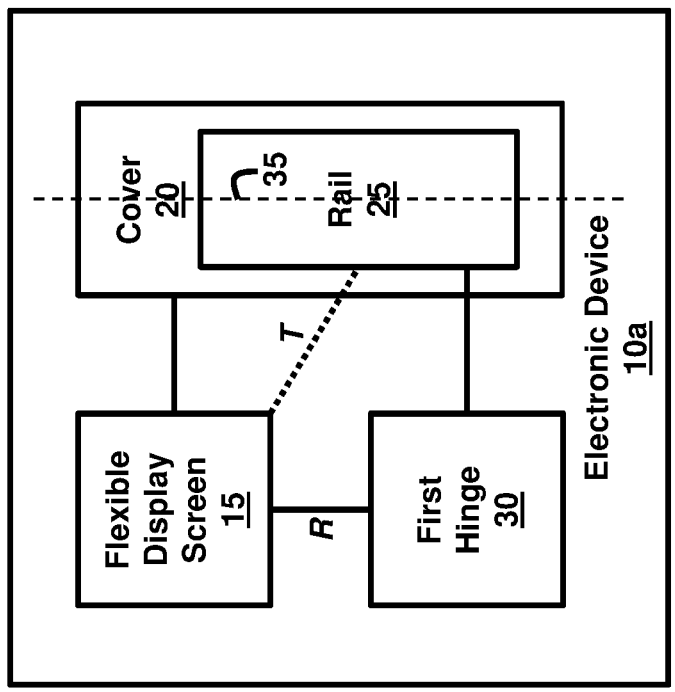
FIG. 4 is a block diagram illustrating the electronic device of FIG. 1 containing a cover that rotates with respect to a display screen and a base housing, according to an example.

FIG. 4, with reference to FIGS. 1 through 3, is a block diagram illustrating that the cover 20 may comprise a first end 40 and a second end 45. In an example, first end 40 may comprise the upper portion of the cover 20 and the second end 45 may comprise the lower portion of the cover 20. The first end 40 is to rotate with respect to the flexible display screen 15. In this regard, flexible display screen 15 with the first hinge 30 may be positioned at the first end 40 in order to enable the rotation of the first end 40 of the cover 20 with respect to the flexible display screen 15. In an example, the rotation may be the same rotation R of the flexible display screen 15 with respect to the first hinge 30. In another example, the rotation of the cover 20 with respect to the flexible display screen 15 at the first end 40 may occur through a structure or mechanism other than first hinge 30.

The second end 45 of the cover 20 may comprise a second hinge 50 to enable rotation of the cover 20 with respect to a base housing 55. In some examples, the second hinge 50 may be a mechanical, electrical, magnetic, or electro-magnetic device, or a combination thereof, which may be set in position on the second end 45 of the cover 20. Furthermore, the second hinge 50 may be set to be rotatable or permit the connected structures; i.e., the cover 20 and base housing 55, be rotatable with respect to one another, according some examples. In an example, the base housing 55 may be a panel, bezel, keyboard, etc. of the electronic device 10a, such as a laptop, tablet, or notebook computer. The base housing 55 may comprise any suitable configuration, shape, or material suitable for containing the electronics and components of the electronic device 10a. Moreover, the base housing 55 may comprise any suitable portion of the panel, bezel, keyboard, etc. of the electronic device 10a, and in an example, the base housing 55 may be the keyboard panel of a laptop, tablet, or notebook computer, or a communication device.

Figure 5A:
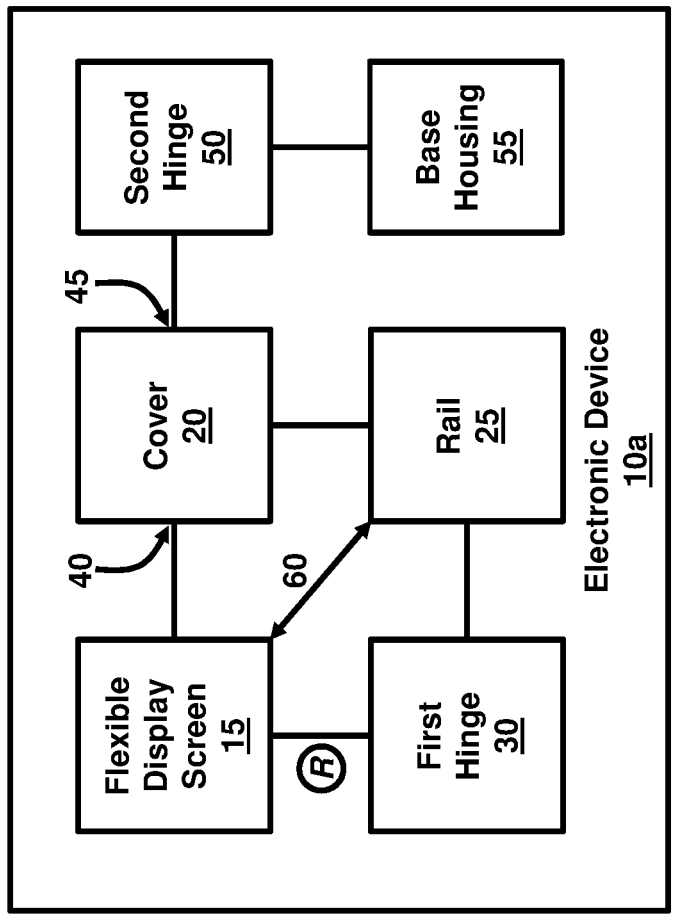
FIG. 5A is a block diagram illustrating the electronic device of FIG. 1 with the rotation of the flexible display screen being enabled, according to an example.

FIG. 5A, with reference to FIGS. 1 through 4, is a block diagram illustrating that the flexible display screen 15 is to rotate R with respect to the first hinge 30 upon the flexible display screen 15 being at a particular position 60 with respect to the rail 25. In an example, the particular position 60 may be established with respect to the height of the cover 20. According to an example, the particular position 60 may be set at the first end 40 of the cover 20, which permits the flexible display screen 15 to rotate R at a greater angular orientation than when the particular position 60 is set somewhere between the first end 40 and the second end 45 of the cover 20. However, the particular position 60 may be set at any suitable location along the rail 25, and the flexible display screen 15 may still be enabled to rotate R. In this regard, there may be a gap between the cover 20 and the flexible display screen 15 to provide a sufficient clearance to enable the flexible display screen 15 to rotate R.

FIG. 5B, with reference to FIGS. 1 through 5A, is a block diagram illustrating that the flexible display screen 15 is disabled from rotating R with respect to the first hinge 30 when the flexible display screen 15 is at another position with respect to the rail 25 other than the particular position 60. According to an example, the particular position 60 may be set at the first end 40 of the cover 20, and upon the flexible display screen 15 being positioned along the rail 25 at a position lower than the particular position 60, the ability of the flexible display screen 15 to rotate R is disabled. Since the particular position 60 may be set at any suitable location along the rail 25, which may be established with respect to the height of the cover 20, then the disabling of the rotation R of the flexible display screen 15 may occur at any suitable position that is lower than the particular position 60. In this regard, in one example, there may be a gap between the cover 20 and the flexible display screen 15 to provide a sufficient clearance to enable the flexible display screen 15 to rotate R. In another example, the cover 20 may abut the flexible display screen 15. Nonetheless, the flexible display screen 15 is disabled from rotating R irrespective of the clearance to rotate. The disabling of the rotation R may occur by the first hinge 30 automatically locking while the first hinge 30 is positioned along the rail 25 lower than the particular position 60 such that the first hinge 30 becomes unlocked once it reaches the particular position 60 thereby enabling rotation R of the flexible display screen 15.

Figure 6D:
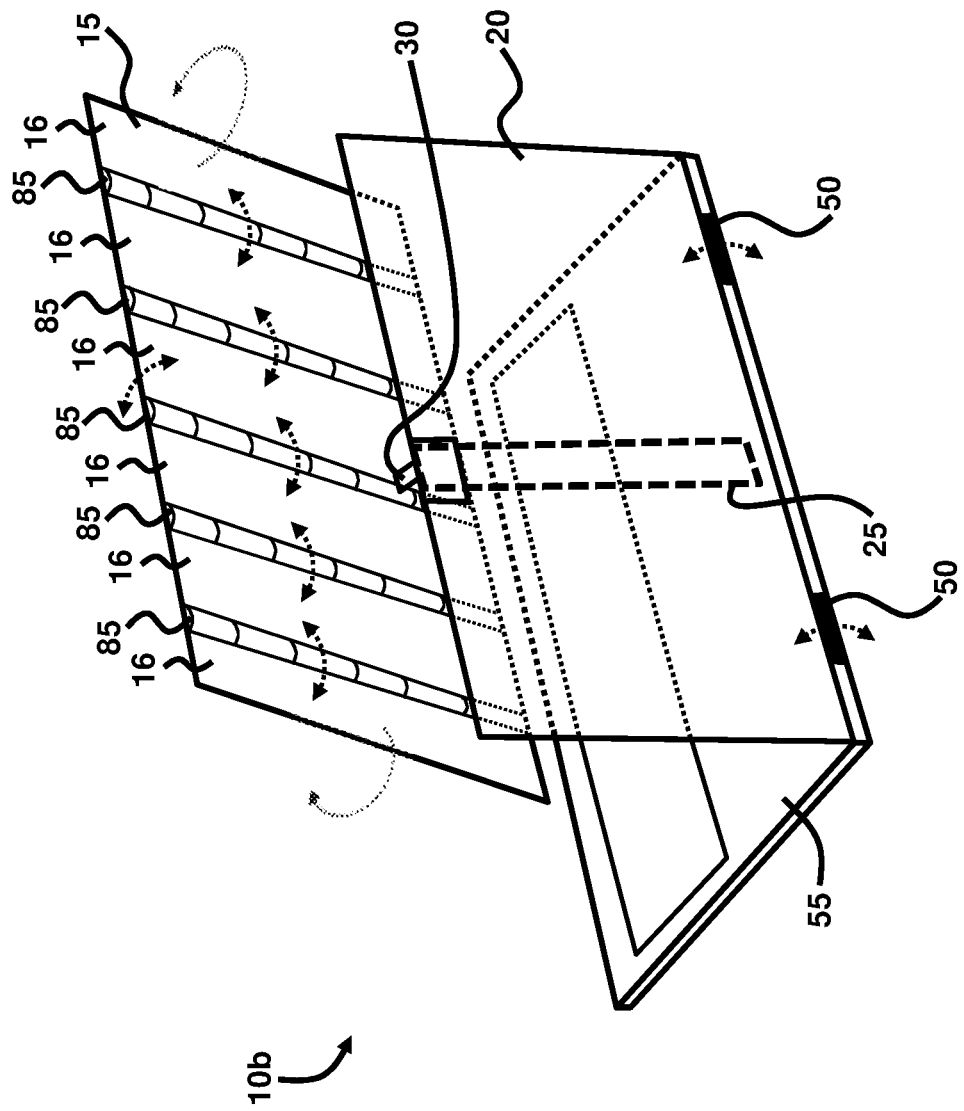
FIG. 6D is a schematic diagram illustrating a rear perspective view of the electronic device of FIG. 6A with multiple pivot hinges on the display screen, according to an example.

FIG. 6A, with reference to FIGS. 1 through 5B, is a schematic diagram illustrating an electronic device 10b. In some examples, the electronic device 10b may comprise a notebook or laptop computer device. The electronic device 10b may comprise a cover 20, a base housing 55, a display screen 15 slidably attached to the cover 20, a rail 25 operatively connected to the display screen 15, a first hinge 30 attached to the display screen 15 and the rail 25, and a second hinge 50 rotatably connecting the cover 20 to the base housing 55. In an example, the cover 20 may be a substantially thin structure, which may be the cover of the electronic device 10b; e.g., the cover of a laptop. The cover 20 may comprise plastic, aluminum, or any other suitable material. Moreover, in an example, the cover 20 may be a substantially rigid structure comprising sufficient material strength characteristics to fully support the display screen 15. In an example, the base housing 55 may be a panel, bezel, keyboard, etc. of the electronic device 10a, such as a laptop, tablet, or notebook computer. The base housing 55 may comprise any suitable configuration, shape, or material suitable for containing the electronics and components of the electronic device 10a. Moreover, the base housing 55 may comprise any suitable portion of the panel, bezel, keyboard, etc. of the electronic device 10a, and in an example, the base housing 55 may be the keyboard panel of a laptop, tablet, or notebook computer, or a communication device.

The display screen 15 may be an organic light-emitting diode (OLED) device, and may be a touch screen in some examples. Furthermore, the display screen 15 may be flexible and comprise any suitable size or configuration to provide for a flexed, bendable, and/or curved orientation, or in a flat/planar orientation based on a user's preference. According to some examples, the rail 25 may be a bar(s) or rack-like device or any other similar structure. The first hinge 30 attached to the flexible display screen 15 may be set to engage the rail 25. In some examples, the first hinge 30 may be a mechanical, electrical, magnetic, or electro-magnetic device, or a combination thereof, which may be set in position on the flexible display screen 15, and which may move along the rail 25.

The rail 25 is to permit the display screen 15 to slide in an upward and downward direction (e.g., translational T direction) with respect to the cover 20. In this regard, the upward and downward direction is based on an orientation where the cover 20 is in a substantially upright position. Nonetheless, the translational T direction may occur irrespective of the orientation or positioning of the cover 20. Additionally, the first hinge 30 is to permit the display screen 15 to rotate R with respect to the rail 25. In examples, the rotation R of the display screen 15 may occur in any angular orientation including front-to-back or side-to-side, or a combination thereof.

FIGS. 6B and 6C, with reference to FIGS. 1 through 6A, are schematic diagrams illustrating that the display screen 15 is to bend about the first hinge 30. The bending of the display screen 15 may occur at any suitable angle based on user preference including a relatively small bending angle as indicated in FIG. 6B or in a much more pronounced bending angle as indicated in FIG. 6C. Moreover, the display screen 15 may bend in a uniform manner or in a non-uniform manner such that one end of the display screen 15 may bend at a greater angle than an opposite end. Furthermore, the display screen 15 may bend along any of its longitudinal or lateral axes, according to some examples. Additionally, the position of the display screen 15 may be further controlled based on the position of the cover 20. More particularly, the cover 20 may rotate about the second hinge 50, or multiple second hinges 50, causing the operatively connected display screen 15 to be positioned further or closer to a user of the electronic device 10b depending on whether the cover 20 is rotated towards the user or away from the user.

The display screen 15, which may be formed of flexible materials, may be bent using any suitable mechanism to cause the display screen 15 to bend, curve, or flex. For example, FIG. 6D, with reference to FIGS. 1 through 6C, is a schematic diagram of the electronic device 10b with multiple pivot hinges 85 positioned on the display screen 15 to provide the ability for the display screen 15 to bend, curve, or flex. The multiple pivot hinges 85 may be arranged at any suitable position on display screen 15. Moreover, the multiple pivot hinges 85 may be embedded in the display screen 15 or positioned on the outer surface of the display screen 15, or a combination thereof. In some examples, the multiple pivot hinges 85 may be arranged in substantially linear columns or rows to create segments 16 on the display screen 15. In this regard, the individual segments 16 may be bent in unison or may be bent in a non-uniform manner including non-bending of some of the individual segments 16. In another example, actuation of any one of the individual segments 16 may cause a reciprocal actuation in any of the other individual segments 16. For example, one segment 16 may be actuated either manually or through an automated mechanism, which causes any of the other segments 16 to become actuated. Accordingly, the actuation of the multiple pivot hinges 85 may be individually controlled manually by a user or may be controlled by an automated mechanism such as a button or GUI that is engaged through the electronic device 10b and/or the display screen 15. Furthermore, the multiple pivot hinges 85 may be set to cause no bending of the individual segments 16 in order to retain the display screen 15 in a flat and planar configuration.

FIG. 7A, with reference to FIGS. 1 through 6D, is a schematic diagram illustrating top views of the electronic device 10b illustrating the display screen 15 transitioning from a substantially planar position to a flexible position with respect to the cover 20. According to an example, the display screen 15 may flex about the first hinge 30 to enable the flexible or curved configuration of the display screen 15. While FIG. 7A depicts the display screen 15 to abut the cover 20, in other examples there may be a gap between the display screen 15 and the cover 20 with the first hinge 30 providing the connection between the display screen 15 and the cover 20. In this regard, a gap may provide greater angular rotation of the display screen 15 when the display screen 15 is not fully raised along the rail 25.

FIG. 7B, with reference to FIGS. 1 through 7A, is a schematic diagram illustrating the electronic device 10b in a closed configuration with the cover 20 and display screen 15 (not shown in FIG. 7B) pushed against the base housing 55. The cover 20 is to rotate about the second hinge 50 to permit rotation of the cover 20 with respect to the base housing 55. The rail 25 may be positioned on the outer surface 21 of the cover 20 in one example, or the rail 25 may be embedded in the cover 20 as described above. As shown in FIG. 7B, the rail 25 may be positioned in or on a substantially central portion 35 of the cover 20, which may bisect the cover 20 into two substantially similarly-sized portions 22, 23.

FIG. 7C, with reference to FIGS. 1 through 7B, is a schematic diagram illustrating the electronic device 10b in an open configuration with the cover 20 and display screen 15 open with respect to the base housing 55. While the display screen 15 may be flexible according to some examples, in another example, the display screen 15 may be rigid and flat as shown in FIG. 7C. Nonetheless, the position of the display screen 15 may be adjusted via the rail 25 as described above with respect to the previous examples. Moreover, the width and height of the display screen 15 may be substantially the same as the cover 20 or they may be different, according to some examples. For example, in FIG. 7C, the display screen 15 is depicted to be taller in height but narrower in width compared to the cover 20.

FIG. 7D, with reference to FIGS. 1 through 7B, is a schematic diagram illustrating the electronic device 10b in an open configuration with the cover 20 and display screen 15 open with respect to the base housing 55 and with the display screen 15 in a bent configuration. As denoted by the various dashed arrows in FIG. 7D, the display screen 15 may be bent in various angular orientations and may also be pulled and pushed to bring the display screen 15 towards a user of the electronic device 10b. Furthermore, the cover 20 may be rotated with respect to the base housing 55 when the display screen 15 is set at any position along the rail 25.

FIG. 7E, with reference to FIGS. 1 through 7D, is a schematic diagram illustrating the electronic device 10b with the display screen 15 translating on the rail 25 in an upward direction with respect to the base housing 55. In FIG. 7E, the display screen 15 is depicted in a bent configuration. As indicated in FIG. 7E, the display screen 15 is operatively connected to one rail 25, according to an example, to permit the height adjust of the display screen 15; i.e., to enable translation T of the display screen 15 with respect to the cover 20. The rail 25 may be positioned on the outer surface 24 of the cover 20 in one example, or the rail 25 may be embedded in the cover 20 as described above. Although a single rail 25 is illustrated in the figures, it should be understood that multiple rails may also be used.

Figure 8A:
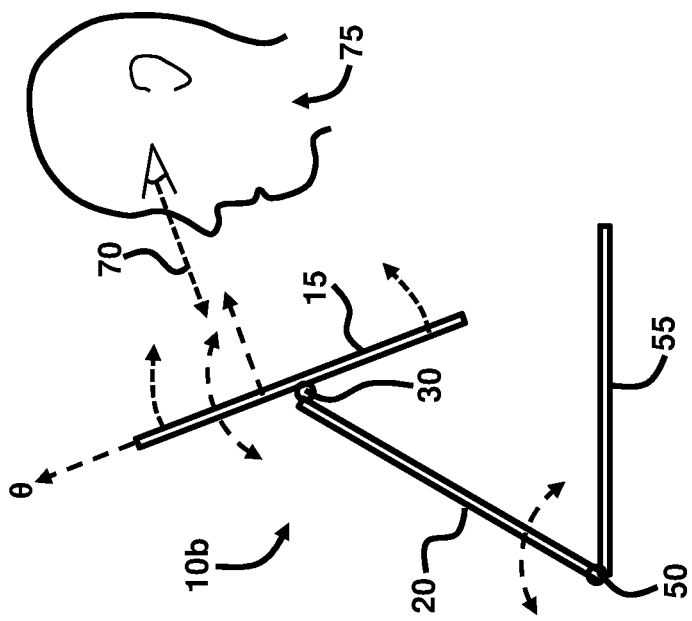
FIG. 8A is a schematic diagram illustrating a side view of the electronic device of FIG. 7A with the display screen raised along a rail in a generally flat position with an adjustable viewing angle with respect to a user, according to an example.
Figure 8B:
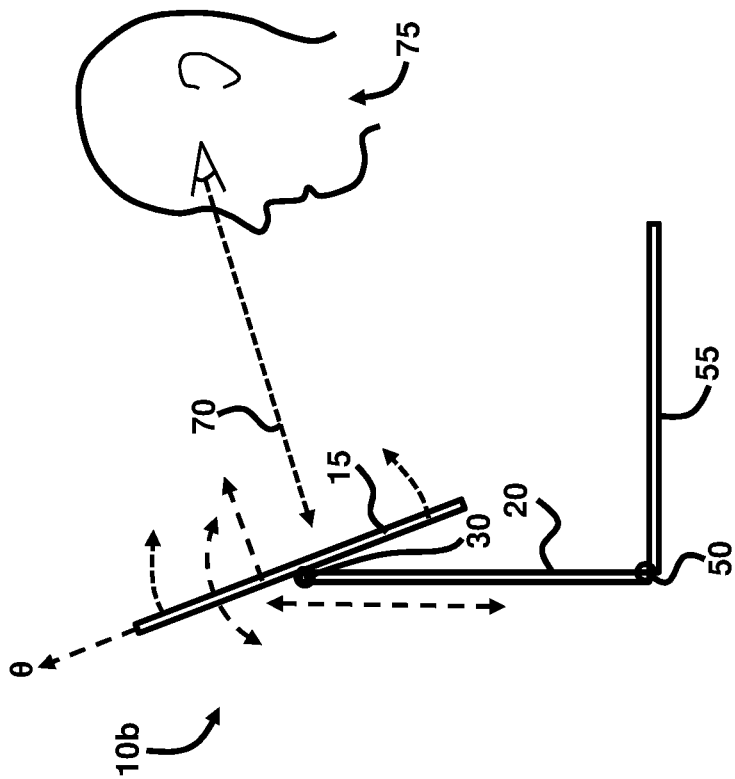
FIG. 8B is a schematic diagram illustrating a side view of the electronic device of FIG. 7A with the cover rotated with respect to a base housing, and with the display screen raised along a rail in a generally flat position with an adjustable viewing angle with respect to a user, according to an example.

FIGS. 8A and 8B, with reference to FIGS. 1 through 7E, are schematic diagrams illustrating that a viewing angle θ of the display screen 15 is adjustable to be perpendicular to an eye level 70 of a user 75 of the electronic device 10b and display screen 15. In FIG. 8A, the electronic device 10a is positioned such that the cover 20 is substantially perpendicular to the base housing 55, and in FIG. 8B, the electronic device 10a is positioned such that the cover 20 is rotated about the second hinge 50 in order to create a substantially acute angle between the cover 20 and the base housing 55. In this position, the display screen 15 may be positioned to be closer to the user 75 without having to move the base housing 55. In the configurations shown in FIGS. 8A and 8B, the position of the display screen 15 with respect to the eye level 70 of the user 75 enables for a more ergonomic experience for the user 75 by permitting the user 75 to keep a better posture and head angle when viewing the display screen 15. Furthermore, by rotating the cover 20 about the second hinge 50, as provided in FIG. 8B, the display screen 15 may be brought in closer proximity to the user 75 without the user 75 having to move closer to the base housing 55. In this regard, the base housing 55 may contain a keyboard and/or mousepad, with which the user 75 may be interacting, and in order to properly interact with the base housing 55, the user 75 may wish to remain at a set distance away from the base housing 55 to permit the user's hands/arms to comfortably and ergonomically reach the base housing 55. Accordingly, the elevated height adjustment of the display screen 15 as well as the rotation of the cover 20 towards the user 75 permits the user 75 to continue to interact with the base housing 55 without interference from the display screen 15, cover 20, or any other structures, thereby enhancing the user's engagement with the electronic device 10b.

Figure 9:
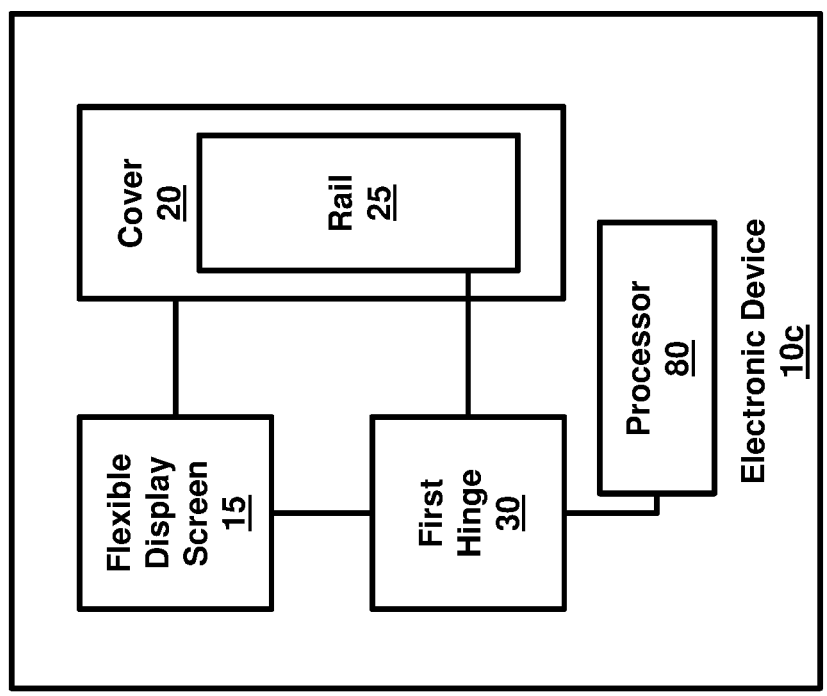
FIG. 9 is a block diagram illustrating an electronic device containing a hinge and rail engaging a flexible display screen, according to an example.

FIG. 9, with reference to FIGS. 1 through 8B, is a block diagram illustrating an electronic device 10c. In some examples, the electronic device 10c may comprise a notebook or laptop computer device. The electronic device 10c may comprise a flexible display screen 15, a cover 20 operatively connected to the flexible display screen 15, a rail 25 in the cover 20, a hinge (e.g., first hinge 30) connecting the flexible display screen 15 to the rail 25, and a processor 80 to control movement of the hinge (e.g., first hinge 30) along the rail 25. The flexible display screen 15 may be an organic light-emitting diode (OLED) device, and may be a touch screen in some examples. Furthermore, the flexible display screen 15 may comprise any suitable size or configuration to provide for a flexed, bendable, and/or curved orientation, or in a flat/planar orientation based on a user's preference. In an example, the cover 20 may be a substantially thin structure, which may be the cover of the electronic device 10c; e.g., the cover of a laptop. The cover 20 may comprise plastic, aluminum, or any other suitable material. Moreover, in an example, the cover 20 may be a substantially rigid structure comprising sufficient material strength characteristics to fully support the flexible display screen 15. According to some examples, the rail 25 may be a bar(s) or rack-like device or any other similar structure. The rail 25 may be fully or partially embedded in the cover 20, according to some examples. In some examples, the first hinge 30 may be a mechanical, electrical, magnetic, or electro-magnetic device, or a combination thereof, which may be set in position on the flexible display screen 15, and which may move along the rail 25. In an example, the combination of the rail 25 and first hinge 30 may operate similar to a rack-and-pinion system. Furthermore, the first hinge 30 may be set to be rotatable or permit connected structures be rotatable, according some examples.

In some examples, the processor 80 described herein and/or illustrated in the figures may include hardware-enabled modules and may include a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits may process computer logic instructions capable of providing digital and/or analog signals for performing various functions as described herein. The various functions can further be physically saved as any of data structures, data paths, data objects, data object models, object files, and database components. For example, the data objects could include a digital packet of structured data. The data structures could include any of an array, tuple, map, union, variant, set, graph, tree, node, and an object, which may be stored and retrieved by computer memory and may be managed by processors, compilers, and other computer hardware components. The data paths may be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), and complex operations (e.g., using single clock calculations, sequential calculations, iterative calculations, etc.). The data objects may be physical locations in computer memory and can be a variable data object, a data structure, or a function. In an example of a relational database, the data objects can be set as a table or column. Other implementations include specialized objects, distributed objects, object-oriented programming objects, and semantic web objects, for example. Furthermore, the data object models can be set as an application programming interface for creating HyperText Markup Language (HTML) and Extensible Markup Language (XML) electronic documents. The models can be further set as any of a tree, graph, container, list, map, queue, set, stack, and variations thereof, according to various examples. The data object files may be created by compilers and assemblers and may contain generated binary code and data for a source file. The database components can include any of tables, indexes, views, stored procedures, and triggers.

In some examples, the processor 80 may comprise a central processing unit (CPU) of the electronic device 10c or an associated computing device, not shown. In other examples the processor 80 may be a discrete component independent of other processing components in the electronic device 10c. In other examples, the processor 80 may be a microprocessor, microcontroller, hardware engine, hardware pipeline, and/or other hardware-enabled device suitable for receiving, processing, operating, and performing various functions required by the electronic device 10c. The processor 80 may be provided in the electronic device 10c, coupled to the electronic device 10c, or communicatively linked to the electronic device 10c from a remote networked location, according to various examples.

Figure 10:
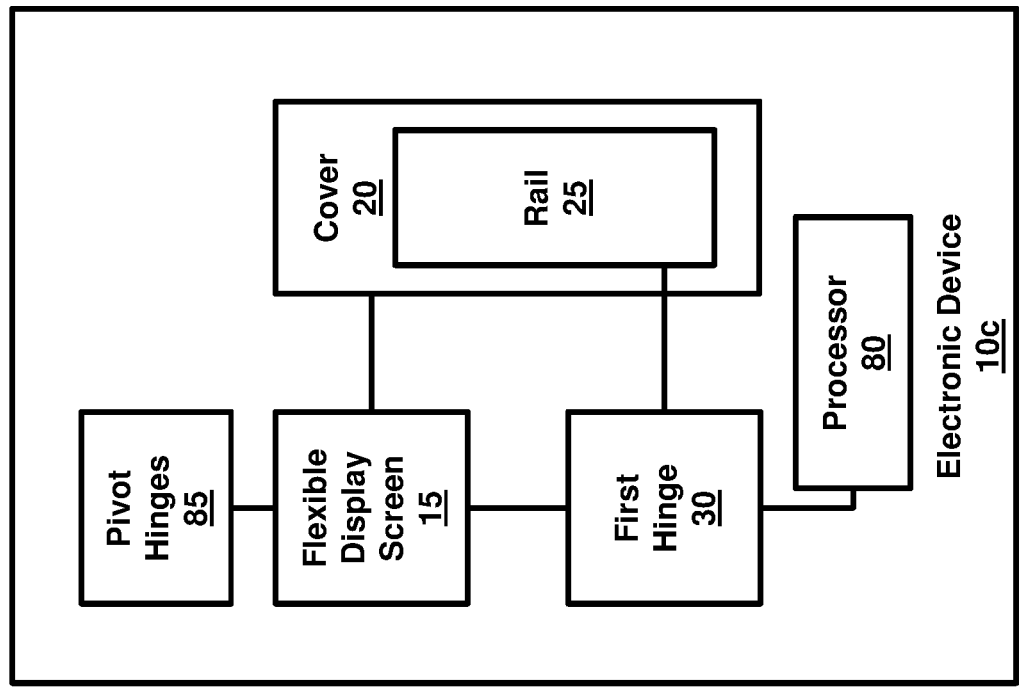
FIG. 10 is a block diagram illustrating the electronic device of FIG. 9 containing pivot hinges to synchronize bending of a cover and flexible display screen, according to an example.

FIG. 10, with reference to FIGS. 1 through 9, is a block diagram illustrating that the electronic device 10c may comprise multiple pivot hinges 85 on the flexible display screen 15 synchronized to uniformly bend the flexible display screen 15, according to an example. In another example, the multiple pivot hinges 85 may be synchronized to non-uniformly bend the flexible display screen 15. According to an example, the processor 80 may control the actuation of the multiple pivot hinges 85 such that a user 75 may engage a button, GUI, or other suitable mechanism to send an electronic, optic, and/or magnetic signal to the processor 80 to, in turn, control the actuation of the multiple pivot hinges 85.

Figure 11:
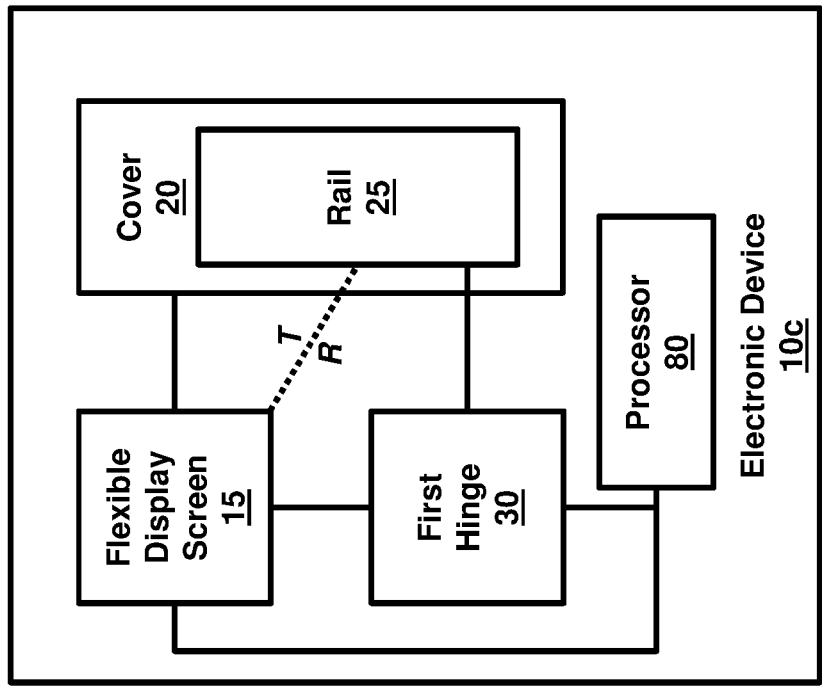
FIG. 11 is a block diagram illustrating the electronic device of FIG. 9 containing a lock to set a position of a hinge on a rail, according to an example.

FIG. 11, with reference to FIGS. 1 through 10, is a block diagram illustrating that the electronic device 10c may comprise a lock 90 connected to the rail 25 to set a position of the hinge (e.g., first hinge 30) on the rail 25. The lock 90 may be set at a predetermined location along the rail 25 or the lock 90 may translate along the rail 25 to set the position of the hinge (e.g., first hinge 30) on the rail 25. According to some examples, the lock 90 may be any of an electrical, mechanical, or magnetic locking mechanism, or a combination thereof. The locking and unlocking of the lock 90 may be controlled by the processor 80 based on user engagement, for example, through a button, GUI, or other suitable mechanism. The lock 90 may set the position of the hinge (e.g., first hinge 30) at any suitable position along the rail 25, which correspondingly sets the position of the display screen 15 that is connected to the hinge (e.g., first hinge 30).

Figure 12:
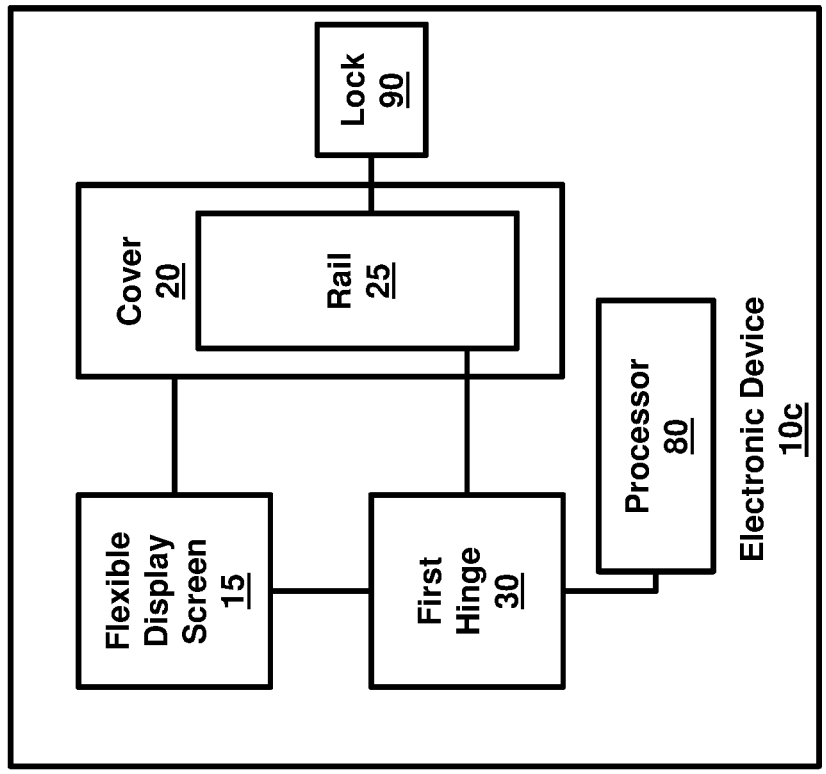
FIG. 12 is a block diagram illustrating the electronic device of FIG. 9 containing a processor to control translational and rotational movement of a flexible display screen along a rail, according to an example.

FIG. 12, with reference to FIGS. 1 through 11, is a block diagram illustrating that the processor 80 is to control translational T and rotational R movement of the flexible display screen 15 along the rail 25 and with respect to the cover 20. According to some examples, the user 75 may engage a button, GUI, or other suitable mechanism to send an electronic, optic, and/or magnetic signal to the processor 80 to, in turn, control the translational T and rotational R movement of the flexible display screen 15 along the rail 25 and with respect to the cover 20. Each of the flexible display screen 15 and the cover 20 is rotatable such that the flexible display screen 15 is rotatable with respect to the hinge (e.g., first hinge 30), and the cover 20 is rotatable with respect to the second hinge 50. Moreover, the processor 80 may control the rotation of any of the hinge (e.g., first hinge 30), second hinge 50, flexible display screen 15, and cover 20, or combinations thereof.

The examples herein may enable a curved and/or bendable screen immersive experience, which may be particularly suitable for gaming uses and environments. The examples described herein help to ensure a comfortable and correct user posture by bringing the display screen 15 at a viewing angle θ at a suitable position with respect to a user 75 to reduce the need for a user 75 to bend forward to be able to adequately view the display screen 15. This allows the user 75 to have a much more user-friendly, ergonomic, and comfortable experience in interacting with the display screen 15.

The present disclosure has been shown and described with reference to the foregoing implementations. Although specific examples have been illustrated and described herein it is manifestly intended that other forms, details, and examples may be made without departing from the scope of the disclosure that is defined in the following claims.

What is claimed is:

1. An electronic device comprising:
a flexible display screen;
a cover operatively connected to the flexible display screen, wherein the cover comprises a substantially same width as the flexible display screen;
a rail attached to the cover; and
a first hinge attached to the flexible display screen to engage the rail,
wherein the flexible display screen is to translate with respect to the rail and the cover, and wherein the flexible display screen is to rotate with respect to the first hinge.

2. The electronic device of claim 1, wherein the rail is embedded in the cover.

3. The electronic device of claim 1, wherein the rail is positioned in a substantially center portion of the cover.

4. The electronic device of claim 1, wherein the cover comprises a first end and a second end, wherein the first end is to rotate with respect to the flexible display screen, and wherein the second end comprises a second hinge to enable rotation of the cover with respect to a base housing.

5. The electronic device of claim 4, wherein the flexible display screen is to rotate with respect to the first hinge upon the flexible display screen being at a particular position with respect to the rail.

6. The electronic device of claim 5, wherein the flexible display screen is disabled from rotating with respect to the first hinge when the flexible display screen is at another position with respect to the rail other than the particular position.

7. An electronic device comprising:
a cover;
a base housing;
a display screen slidably attached to the cover, wherein the cover comprises a substantially same width as the display screen;
a rail operatively connected to the display screen, wherein the rail is to permit the display screen to slide in an upward and downward direction with respect to the cover;
a first hinge attached to the display screen and the rail, wherein the first hinge is to permit the display screen to rotate with respect to the rail; and
a second hinge rotatably connecting the cover to the base housing.

8. The electronic device of claim 7, wherein the display screen is to bend about the first hinge.

9. The electronic device of claim 7, wherein the display screen is operatively connected to one rail.

10. The electronic device of claim 7, wherein a viewing angle of the display screen is adjustable to be perpendicular to an eye level of a user of the display screen.

11. An electronic device comprising:
a flexible display screen;
a cover operatively connected to the flexible display screen, wherein the cover comprises a substantially same width as the flexible display screen, and wherein the flexible display screen is to slide with respect to the cover;
a rail in the cover;
a hinge connecting the flexible display screen to the rail; and
a processor to control movement of the hinge along the rail, wherein the processor is to control translational and rotational movement of the flexible display screen along the rail and with respect to the cover.

12. The electronic device of claim 11, comprising multiple pivot hinges on the flexible display screen synchronized to uniformly bend the flexible display screen.

13. The electronic device of claim 11, comprising a lock connected to the rail to set a position of the hinge on the rail.

14. The electronic device of claim 11, wherein the processor is to control rotational movement of the hinge, flexible display screen, and cover, or a combination thereof.

15. The electronic device of claim 11, wherein each of the flexible display screen and the cover is rotatable.

16. The electronic device of claim 1, comprising a gap between the cover and the flexible display screen.

17. The electronic device of claim 7, comprising a gap between the cover and the display screen.

18. The electronic device of claim 11, comprising a gap between the cover and the flexible display screen.

19. The electronic device of claim 12, wherein the multiple pivot hinges are arranged in substantially linear columns to create multiple segments on a back of the display screen.

20. The electronic device of claim 19, wherein the multiple segments are to bend in unison or in a non-uniform manner.

\* \* \* \* \*